(12) United States Patent
Nakamura et al.

(10) Patent No.: US 8,845,169 B2
(45) Date of Patent: Sep. 30, 2014

(54) ILLUMINATION APPARATUS

(75) Inventors: Kyohei Nakamura, Kyoto (JP); Satoru Yamauchi, Osaka (JP); Toshizumi Okada, Osaka (JP); Hiroyuki Yamaoka, Osaka (JP)

(73) Assignee: Panasonic Corporation, Osaka (JE)

( * ) Notice: Subject to any disclaimer, the term of this patent is extended or adjusted under 35 U.S.C. 154(b) by 127 days.

(21) Appl. No.: 13/565,131

(22) Filed: Aug. 2, 2012

(65) Prior Publication Data

US 2013/0051066 A1 Feb. 28, 2013

(30) Foreign Application Priority Data

Aug. 24, 2011 (JP) ................. 2011-183012

(51) Int. Cl.
| | |
|---|---|
| *F21V 8/00* | (2006.01) |
| *F21V 13/02* | (2006.01) |
| *F21V 7/00* | (2006.01) |
| *F21V 5/04* | (2006.01) |
| *F21V 3/02* | (2006.01) |
| *F21K 99/00* | (2010.01) |
| *F21Y 103/02* | (2006.01) |
| *F21S 8/04* | (2006.01) |
| *F21Y 101/02* | (2006.01) |

(52) U.S. Cl.
CPC ... *F21V 3/02* (2013.01); *F21K 9/52* (2013.01); *F21V 2008/006* (2013.01); *F21V 7/0091* (2013.01); *F21Y 2103/022* (2013.01); *G02B 6/0073* (2013.01); *G02B 6/0068* (2013.01); *F21V 2008/003* (2013.01); *F21V 7/0016* (2013.01); *F21V 5/045* (2013.01); *F21S 8/04* (2013.01); *F21Y 2101/02* (2013.01); *G02B 6/0021* (2013.01)
USPC ............. 362/606; 362/268; 362/235

(58) Field of Classification Search
CPC ...................................... F21V 5/045
USPC .................. 362/606, 613, 268, 235, 249.02
See application file for complete search history.

(56) References Cited

U.S. PATENT DOCUMENTS

| | | | |
|---|---|---|---|
| 6,767,120 B2 | 7/2004 | Ohtsuka et al. | |
| 2002/0136502 A1 | 9/2002 | Bachl et al. | |

(Continued)

FOREIGN PATENT DOCUMENTS

| | | |
|---|---|---|
| CN | 1813156 | 8/2006 |
| CN | 10131507 | 2/2008 |

(Continued)

OTHER PUBLICATIONS

European Search Report for corresponding European Application No. 12005704.7 dated Feb. 19, 2013.

(Continued)

*Primary Examiner* — Elmito Breval
(74) *Attorney, Agent, or Firm* — Renner, Otto, Boisselle & Sklar, LLP

(57) ABSTRACT

An illumination apparatus includes light sources; a light guide plate guiding lights from the light sources; a housing holding the light sources and the light guide plate; and an apparatus attachment part. The light sources are arranged around the apparatus attachment part 5, and the light guide plate 3 is provided outside the apparatus attachment part to face the housing and cover a front side of the light sources. The light guide plate includes a main light guide part guiding lights from the light sources toward an outer periphery of the light guide plate and scattering and emitting the lights to a surface of the main light guide part; and an auxiliary light guide part integrated with the main light guide part at an inner peripheral side of the main light guide part and guiding and emitting the lights from the light sources toward the central portion of the housing.

9 Claims, 7 Drawing Sheets

(56) References Cited

U.S. PATENT DOCUMENTS

| | | |
|---|---|---|
| 2004/0047161 A1 | 3/2004 | Mochizuki et al. |
| 2006/0067640 A1 | 3/2006 | Hsieh et al. |
| 2008/0043462 A1 | 2/2008 | Kwon et al. |
| 2008/0225509 A1 | 9/2008 | Greiner |
| 2010/0046217 A1 | 2/2010 | Ngai |
| 2010/0123397 A1 | 5/2010 | Tian et al. |
| 2010/0208490 A1 | 8/2010 | Tsuchiya et al. |
| 2010/0277926 A1 | 11/2010 | Wen |

FOREIGN PATENT DOCUMENTS

| | | |
|---|---|---|
| FR | 729415 | 7/1932 |
| JP | 2002-304904 | 10/2002 |
| JP | 2004-103379 | 4/2004 |
| JP | 2006-80095 | 3/2006 |
| JP | 3984023 | 7/2007 |
| JP | 4066702 | 1/2008 |
| JP | 2010-003597 | 1/2010 |
| JP | 2010-262856 | 11/2010 |
| JP | 2011-134684 | 7/2011 |
| JP | 2012-104476 | 5/2012 |
| WO | 2009/048053 | 4/2009 |
| WO | 2009/111494 | 9/2009 |
| WO | 2010/055940 | 5/2010 |

OTHER PUBLICATIONS

Chinese Office Action for corresponding Chinese Application No. 201210277477.5 dated May 19, 2014 and English translation thereof.

ILLUMINATION APPARATUS

FIELD OF THE INVENTION

The present invention relates to an illumination apparatus which is capable of providing a uniform irradiation of light from a light source.

BACKGROUND OF THE INVENTION

In recent years, domestic main illumination apparatuses such as ceiling lights using light emitting diodes (LEDs) as a light source has been in wide use. FIG. 6 shows such one conventional illumination apparatus 101. The illumination apparatus 101 includes an illumination module (not shown) including LEDs as a light source; a transparent cover 102 which transmits light from the illumination module; a housing 103 which holds the illumination module and the transparent cover 102; and a center cover 104 which is made of an opaque material and covers a central portion of the housing 103. In the central portion of the housing 103 covered with the center cover 104, there are provided a power supply unit which supplies a power to the illumination module and an apparatus attachment part which fixes the illumination apparatus to a ceiling. Light from the illumination module is outputted through the entire surface of the transparent cover 102.

In the illumination apparatus shown in FIG. 6, the center cover 104 is provided in the central portion of the illumination apparatus 101, and thus no light is emitted from this central portion. For that reason, when the illumination apparatus 101 is turned on, the central portion becomes dark, and thus the illumination apparatus 101 shows poor visual quality as compared to, e.g., conventional ceiling lights using a ring-like fluorescent lamp as a light source.

Apart from the above, there has been proposed an illumination apparatus in which a light guide plate and a reflector are used to emit light from light sources through the central portion of the illumination apparatus in order to increase an emission area without increasing the number of light sources (see, e.g., Japanese Patent No. 4066702). In this illumination apparatus, some of the lights from the light sources arranged on the circumference near the inner periphery of a lamp housing are inserted into the light guide plate and led to the central portion of the illumination apparatus. Then, the lights outputted to the light guide plate are reflected by the reflector arranged in the lamp housing side of the light guide plate and are outputted in a light irradiation direction through a transmitting part of the light guide plate.

However, in the illumination apparatus disclosed in Japanese Patent No. 4066702, the light guide plate and the reflector overlap with each other in the light irradiation direction and some of the lights incident from the light sources into the light guide plate shuttles between the light guide plate and the reflector, which shows low light use efficiency.

SUMMARY OF THE INVENTION

In view of the above, the present invention provides an illumination apparatus capable of providing uniform light irradiation from a light source over the entire surface of the illumination apparatus without deteriorating light use efficiency.

In accordance with an aspect of the present invention, there is provided an illumination apparatus, including light sources; a light guide plate which guides lights from the light sources; a housing which holds the light sources and the light guide plate; and an apparatus attachment part which is provided in a central portion of the housing, wherein the light sources are arranged around the apparatus attachment part 5, and the light guide plate 3 is provided outside the apparatus attachment part and is arranged to face the housing and cover a front side of the light sources, and wherein the light guide plate includes a main light guide part which guides the lights from the light sources toward an outer periphery of the light guide plate and scatters and emits the lights to a surface of the main light guide part; and an auxiliary light guide part which is integrated with the main light guide part at an inner peripheral side of the main light guide part and guides and emits the lights from the light sources toward the central portion of the housing.

In the illumination apparatus, the light guide plate may have a total-reflective surface which is formed between the main light guide part and the auxiliary light guide part and totally reflects lights, which are incident from the light sources into the light guide plate, into the main light guide part.

In the illumination apparatus, the auxiliary light guide part may have an inner peripheral end which is located in the opposite side to the main light guide part and is provided to extend to approach the central portion of the housing.

In the illumination apparatus, the light guide plate may have a transmission surface which is formed between the main light guide part and the auxiliary light guide part and transmits and externally emits lights incident between surfaces which totally reflect the lights, incident from the light sources in the light guide plate, into the main light guide part, with no total-reflection.

In the illumination apparatus, the auxiliary light guide part may be inclined toward the central portion of the housing, forming an acute angle with the housing, and has a convex light emission surface formed in the outer peripheral end side thereof; and a concave light emission surface formed in the main light guide part side.

In the illumination apparatus, the light guide plate may have a lateral light guide part which is integrated with the main light guide part in the outer periphery of the main light guide part and emits an incident light toward the outer periphery of the housing.

In the illumination apparatus, the lateral light guide part may be inclined toward the outer periphery of the housing, forming an acute angle with the housing, and has a concave light emission surface formed in the outer peripheral end side thereof; and a convex light emission surface formed in the main light guide part side.

In the illumination apparatus, the total-reflective surface may have an uneven section perpendicular to a light guide direction of the main light guide part, and a width and a height of a convex portion in the section become increased in the light guide direction of the main light guide part.

The illumination apparatus may further include a diffusing transmission member which diffuses a light emitted from the light guide plate. With the illumination apparatus in accordance with the aspect of the present invention, the lights incident from the light sources into the auxiliary light guide part of the light guide plate are emitted toward the central portion of the housing, and the lights incident from the light sources into the main light guide part of the light guide plate are guided toward the outer periphery of the light guide plate and are diffused and emitted from a light emission surface of the main light guide part. As a result, the lights from the light sources can be uniformly irradiated from the entire surface of the illumination apparatus. In addition, since the lights incident from the light sources into the light guide plate can be directly irradiated from the auxiliary light guide part, it is possible to prevent decrease in light use efficiency.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Figure 1A:
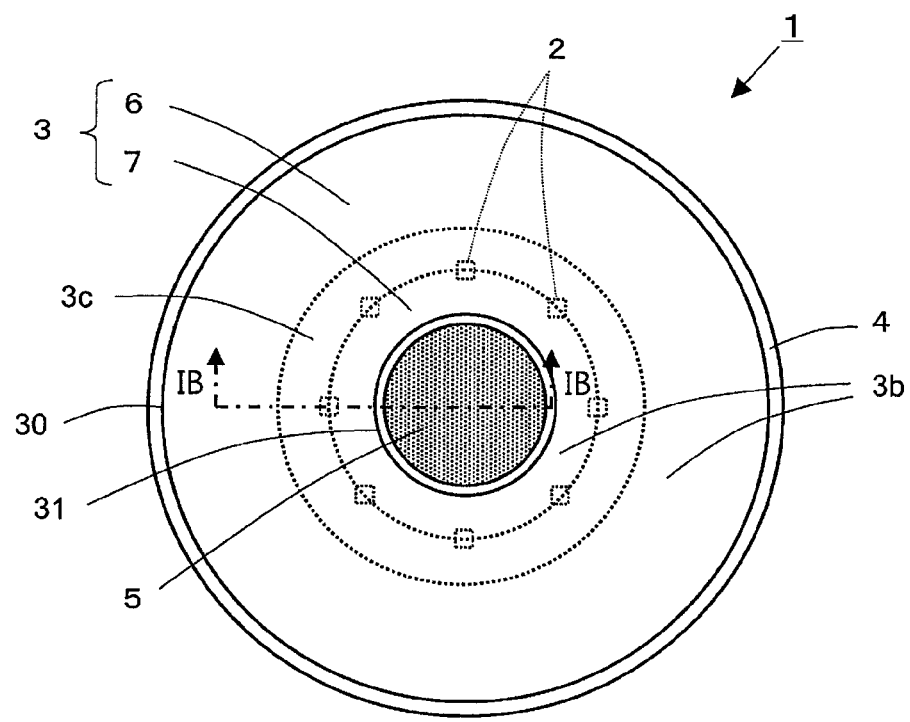
FIGS. 1A to 1D are a plan view of an illumination apparatus when viewed from the front, in accordance with a first embodiment of the present invention, a sectional view taken along line IB-IB in FIG. 1A, a schematic enlarged sectional view of an auxiliary light guide part of the illumination apparatus in accordance with an example reference, and a schematic enlarged sectional view of the auxiliary light guide part of the illumination apparatus, respectively.
Figure 1B:
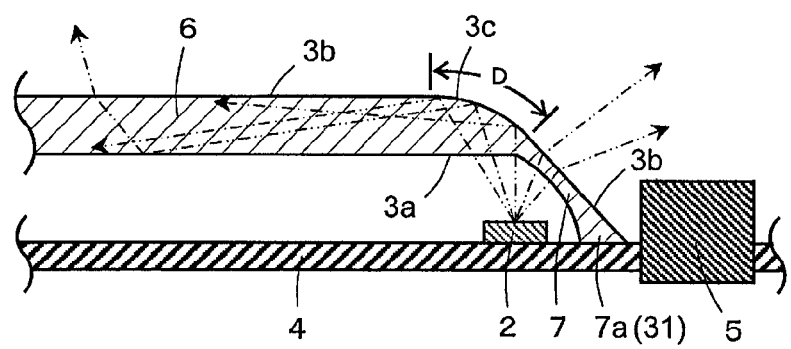
Figure 1C:
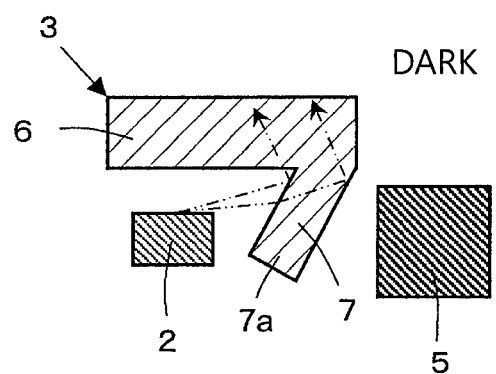

An illumination apparatus in accordance with a first embodiment of the present invention will now be described with reference to FIGS. 1A to 1C which form a part hereof. In the following description, an illumination apparatus 1 of this embodiment will be illustrated with a ceiling light. The illustration apparatus 1 includes light sources 2; a light guide plate 3 which guides light from the light sources 2; a housing 4 which holds the light sources 2 and the light guide plate 3; and an apparatus attachment part 5 provided in a central portion of the housing 4.

The light sources 2 are arranged in the form of a ring at the front side of the housing 4 around the apparatus attachment part 5, and the light guide plate 3 is arranged outside the apparatus attachment part 5 in such a way as to face the housing 4 and cover the front side of the light sources 2. That is, the light guide plate 3 is arranged to face the housing 4 except the apparatus attachment part 5 provided in the central portion of the housing 4. The apparatus attachment part 5 is attached to a power supply unit (not shown) installed on a ceiling for electrical connection between the illumination apparatus 1 and the power supply unit and fixation to the ceiling. When the illumination apparatus 1 is powered on from the power supply unit, the light sources 2 emit lights which are then incident into the light guide plate 3.

In this example, an LED module to emit white light is appropriately used as the light sources 2. The number of light sources 2 is not particularly limited but may be appropriately determined depending on production costs, desired brightness and so on. The LED module serving as the light sources 2 is formed, for example, by mounting LED chips on a mounting board (not shown) and covering the LED chips with a resin material which contains florescent materials or the like. A wiring board (not shown) having a power supply wiring pattern is provided inside the housing 4, and the light sources 2 are held to the housing 4 along with the light guide plate 3 via the wiring board.

The light guide plate 3 has an outer peripheral end 30 located along the periphery of the housing 4; and an inner peripheral end 31 located along the periphery of the apparatus attachment part 5. The light guide plate 3 has a shape where a portion thereof between the outer peripheral end 30 and the inner peripheral end 31 projects toward the front side of the illumination apparatus 1 so as to form a space between the portion and the housing 4, the space being located above the housing 4.

In addition, the light emitting plate 3 includes a flat main light guide part 6; and an auxiliary light guide part 7 which is integrated with the main light guide part 6 at the inner peripheral side of the main light guide part 6. The main light guide part 6 has a flat light incidence surface 3a facing the housing 4 in the side of the housing 4; and a flat light emission surface 3b in the front side of the illumination apparatus 1 in the opposite side to the housing 4. Here, the light incidence surface 3a is a surface into which light is incident from the light sources 2, and the light emission surface 3b is a surface through which light propagated into the light guide plate 3 is emitted to the outside.

In the inner peripheral side of the main light guide part 6, a curved total-reflective surface 3c is provided between the main light guide part 6 and the auxiliary light guide part 7, the curved total-reflective surface 3c smoothly continuing to the light emission surface 3b of the main light guide part 6 and totally reflecting the light, which is incident from the light sources 2 into the light guide plate 3, into the main light guide part 6. In FIG. 1B, the total-reflective surface 3c is denoted by "D" and is formed at a position nearer the apparatus attachment part 5 in the central portion of the illumination apparatus 1 than the light emission surface 3b of the main light guide part 6. In addition, the total-reflective surface 3c is inclined at a predetermined angle with respect to the housing 4.

The inclination of the total-reflective surface 3c is designed in consideration of, for example, a refractive index of the main light guide part 6, a positional relationship between the main light guide part 6 and the light sources 2, and a refraction in the light incidence surface 3a of the main light guide part 6 such that an incidence angle of the light from the light sources 2 exceeds a critical angle. By the designed total-reflective surface 3c, the light, which is incident from the light sources 2 into the light incidence surface 3a, can be effectively guided toward the outer periphery of the light guide plate 3. The main light guide part 6 as configured above can guide the light from the light sources 2 toward the outer periphery of the light guide plate 3, scatter the light on a surface of the main light guide part 6, and radiate the light, which is emitted from the light sources 2, from portions except the central portion of the illumination apparatus 1.

The auxiliary light guide part 7 is integrated with the main light guide part 6 at the inner peripheral side of the main light guide part 6 via the total-reflective surface 3c and is provided to extend such that its inner peripheral end 7a (the inner peripheral end 31) located in the opposite side to the main light guide part 6 approaches to the central portion of the housing 4. In addition, the auxiliary light guide part 7 is inclined toward the central portion of the housing 4, forming an acute angle with the housing 4, and is formed to conform to the periphery of the apparatus attachment part 5 provided in the central portion of the housing 4 of the light sources 2.

A surface of the auxiliary light guide part 7 facing the housing 4 corresponds to the light incidence surface 3a, and the opposite side to the housing 4 of the front side corresponds to the light emission surface 3b. As the light incidence surface 3a of the auxiliary light guide part 7 smoothly continues to the light incidence surface 3a of the main light guide part 6, the light emission surface 3b of the auxiliary light guide part 7 also smoothly continues to the total-reflective surface 3c.

With the above-described configuration of the auxiliary light guide part 7, the light from the light sources 2 can be appropriately incident into and refracted by the auxiliary light guide part 7 to be guided toward the central portion of the housing 4. Thus, the light from the light sources 2 can be easily collected in the central portion of the housing 4, which can result in radiation of the more amount of light from the central portion of the illumination apparatus 1.

For example, if the inner peripheral end 7a of the auxiliary light guide part 7 is provided to extend such that it is bent at an acute angle from the inner side to outer side of the light guide plate 3 (see FIG. 1C), the light incident from the light sources 2 into the auxiliary is easy to be reflected to the light incident surface 3a or totally reflected to the light emission surface 3b while being difficult to be transmitted through the auxiliary light guide part 7. In this case, the light from the light sources 2 cannot be efficiently irradiated at the central portion of the illumination apparatus 1.

Figure 1D:
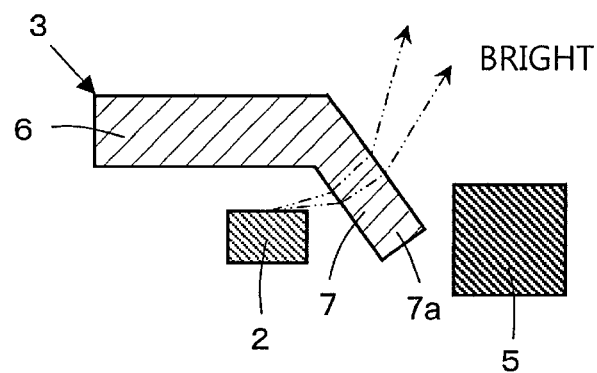

In contrast, in this embodiment, the inner peripheral end 7a of the auxiliary light guide part 7 is provided to extend to approach the central portion of the housing 4 while being bent at an obtuse angle (see FIG. 1D). With this configuration, the light from the light sources 2 is easy to be transmitted through the light incidence surface 3a and light emission surface 3b of the auxiliary light guide part 7, and thus the light from the light sources 2 can be efficiently irradiated at the central portion of the illumination apparatus 1.

The housing 4 serves as a member which supports the light sources 2, the light guide plate 3 and the like of the illumination apparatus 1 and has a high-reflective inner surface. The housing 4 is appropriately made of, for example, a metal material such as aluminum or the like. Alternatively, the housing 4 may be formed, for example, by processing polyethyleneterephthalate (PET) rein into a predetermined shape. In addition, the housing 4 may have reflectivity by subjecting its inner surface to polishing or coating the inner surface with white paint. In this case, since heat generated by the light sources 2 may expose the interior of the illumination apparatus 1 to a high temperature, the housing 4 is required to be made of a material having high heat resistance and durability. The housing 4 may have different shapes, without being limited to the ring shape, which determine the external appearance of the illumination apparatus 1.

In addition, a holding member (not shown) to hold a gap between the housing 4 of the illumination apparatus 1 and the ceiling and stabilize fixation of the illumination apparatus 1 to the ceiling may be interposed between the housing 4 of the illumination apparatus 1 and the ceiling. This holding member is disposed to surround the apparatus attachment part 5 and is fixed to the ceiling during constructing the illumination apparatus 1 or fixed to or integrated with the outer surface of the housing 4.

The apparatus attachment part 5 is, for example, of a cylindrical shape having a predetermined thickness, disposed in the central portion of the housing 4, and includes a hook-shaped terminal (not shown) projecting to the outside of the apparatus. When this terminal is electrically connected to a terminal receiver (not shown) formed in the power supply unit, the illumination apparatus 1 is fixed to the ceiling while supplying a power to a circuit for emission of the light sources 2. Thus, the illumination apparatus 1 can be simply constructed.

In the illumination apparatus 1 of this embodiment, the light from the light sources 2 is radially emitted from near the central portion of the illumination apparatus 1 and is incident into the light incidence surface 3a of the light guide plate 3 or the inner surface of the housing 4. The light incident into the light incidence surface 3a of the main light guide part 6 near the central portion of the housing 4 is incident into the total-reflective surface 3c and is totally reflected toward the outer periphery of the light guide plate 3, and then is incident into the light incidence surface 3a or light emission surface 3b of the main light guide part 6.

At this time, if an incidence angle of the light incident into the light incidence surface 3a or the light emission surface 3b is equal to or larger than a critical angle, the light is again totally reflected to propagate into the main light guide part 6. On the other hand, if the incidence angle is smaller than the critical angle, the light is externally emitted through the light incidence surface 3a or the light emission surface 3b.

The light emission surface 3b is subjected to a roughening treatment to restrict the total reflection of the light guided in the main light guide part 6 and diffuse light therefrom to the outside of the light guide plate 3. Accordingly, some of the lights incident into the light emission surface 3b of the main light guide part 6 are externally emitted and irradiated in the front side of the illumination apparatus 1, and are then uniformly scattered. The light emitted externally from the light incident surface 3a through the main light guide part 6 is reflected from the inner surface of the housing 4 and is again incident from the light incidence surface 3a into the light guide plate 3, and is then guided in the light guide plate 3 and emitted from the light emission surface 3b.

In addition, the light incident into the light incidence surface 3a of the housing 4 side of the main light guide part 6 is incident from the light incidence surface 3a into the light guide plate 3 and guided in the light guide plate 3, and is emitted from the light emission surface 3b. The light directly incident through the light sources 2 into the inner surface of the housing 4 is reflected from the inner surface and is incident from the light incidence surface 3a into the light guide plate 3, and is then guided in the light guide plate 3 and is emitted from the light emission surface 3b.

The light incident into the light incidence surface 3a of the auxiliary light guide part 7 is irradiated from the light emission surface of the auxiliary light guide part 7 toward the central portion of the illumination apparatus 1. At this time, the light is refracted and transmitted without being totally reflected.

With the illumination apparatus 1 of this embodiment, the light incident from the light sources 2 is emitted toward the central portion of the housing 4, and thus the light from the light sources 2 can be irradiated at the central portion of the illumination apparatus 1. In addition, the light incident from the light sources 2 into the light incidence surface 3a near the central portion of the housing 4 of the main light guide part 6 is totally reflected by the total-reflective surface 3c and guided toward the outer periphery of the light guide plate 3, and is then diffused and irradiated in the light emission surface 3b of the main light guide part 6. Accordingly, the light from the light sources 2 can be irradiated in the front side except the central portion of the illumination apparatus 1. As a result, the light from the light sources 2 can be uniformly irradiated from the entire surface of the illumination apparatus 1. In addition, in accordance with this embodiment, since the light incident from the light sources 2 into the light guide plate 3 can be directly irradiated from the auxiliary light guide part 7 in the light irradiation direction, it is possible to prevent decrease in light use efficiency.

Figure 2A:
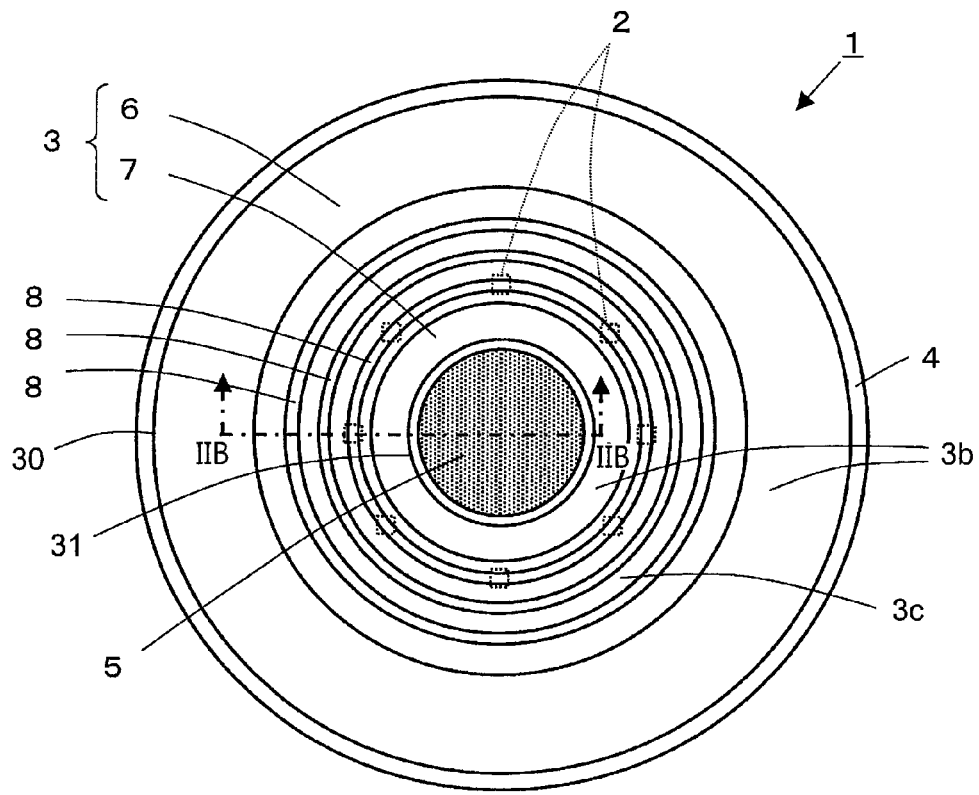
FIGS. 2A and 2B are a plan view of an illumination apparatus in accordance with a second embodiment of the present invention and a sectional view taken along line IIB-IIB in FIG. 2A, respectively.
Figure 2B:
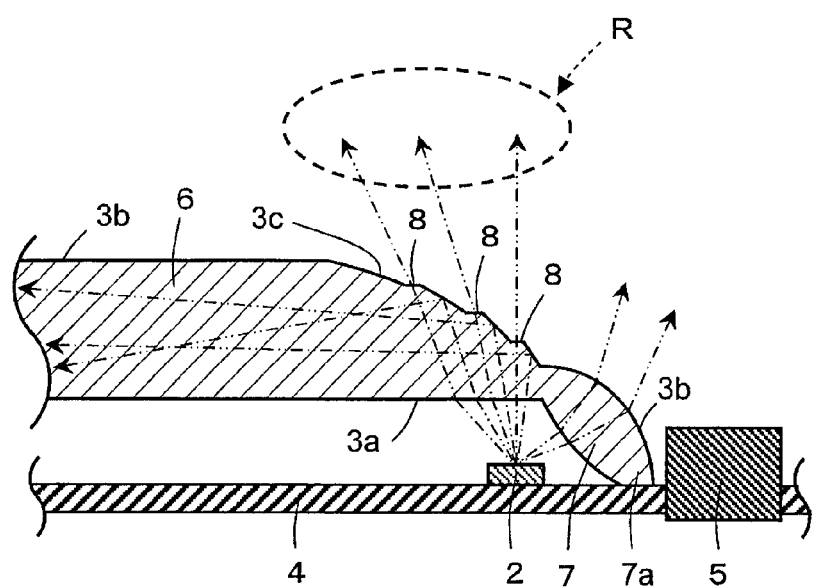

Next, an illumination apparatus in accordance with a second embodiment of the present invention will be described with reference to FIGS. 2A and 2B. In an illumination apparatus 1 in accordance with this embodiment, a light guide plate 3 includes transmission surfaces 8 which are interposed between total-reflective surfaces 3c to transmit and externally emit incident lights with no total-reflection. Each of the transmission surfaces 8 have a stepped plane in parallel to the housing 4, which is formed between the corresponding total-reflective surfaces 3c.

Further, in this embodiment, a light incidence surface 3a of an auxiliary light guide part 7 has a convex shape and a light emission surface 3b of the auxiliary light guide part 7 has a convex shape as well. The light incidence surface 3a of the auxiliary light guide part 7 continues to a light incidence surface 3a of a main light guide part 6 in a bent manner, and the light emission surface 3b of the auxiliary light guide part 7 also continues to the total-reflective surfaces 3c in a bent manner. In addition, a light emission surface 3b of the main light guide part 6 continues to the total-reflective surfaces 3 in a bent manner. Other configurations are the same as those in the first embodiment.

In the illumination apparatus of this embodiment, lights incident into the light incidence surface 3a near the central portion of the housing 4 of the main light guide part 6 are incident into the total-reflective surface 3c and the transmission surfaces 8. The lights incident into the transmission surfaces 8 are transmitted through the transmission surfaces 8 without being totally reflected, and is irradiated to a region "R" where light cannot be irradiated in the case of the total-reflective surface 3c in the first embodiment. The lights incident into the total-reflective surfaces 3c are totally reflected toward the outer periphery of the light guide plate 3, as in the first embodiment. Lights incident into the light guide surface 3a of the auxiliary light guide part 7 are irradiated from the light emission surface 3b of the auxiliary light guide part 7 toward the central portion of the illumination apparatus 1, as in the first embodiment.

With the illumination apparatus 1 of this embodiment, since the lights transmitted through the transmission surfaces 8 formed in some of the total-reflective surfaces 3c can be irradiated to the region R, it is possible to restrict non-uniform irradiation of an emission surface of the illumination apparatus 1 and uniformly irradiate the lights from the light sources 2 through the entire surfaces of the illumination apparatus 1.

Figure 3A:
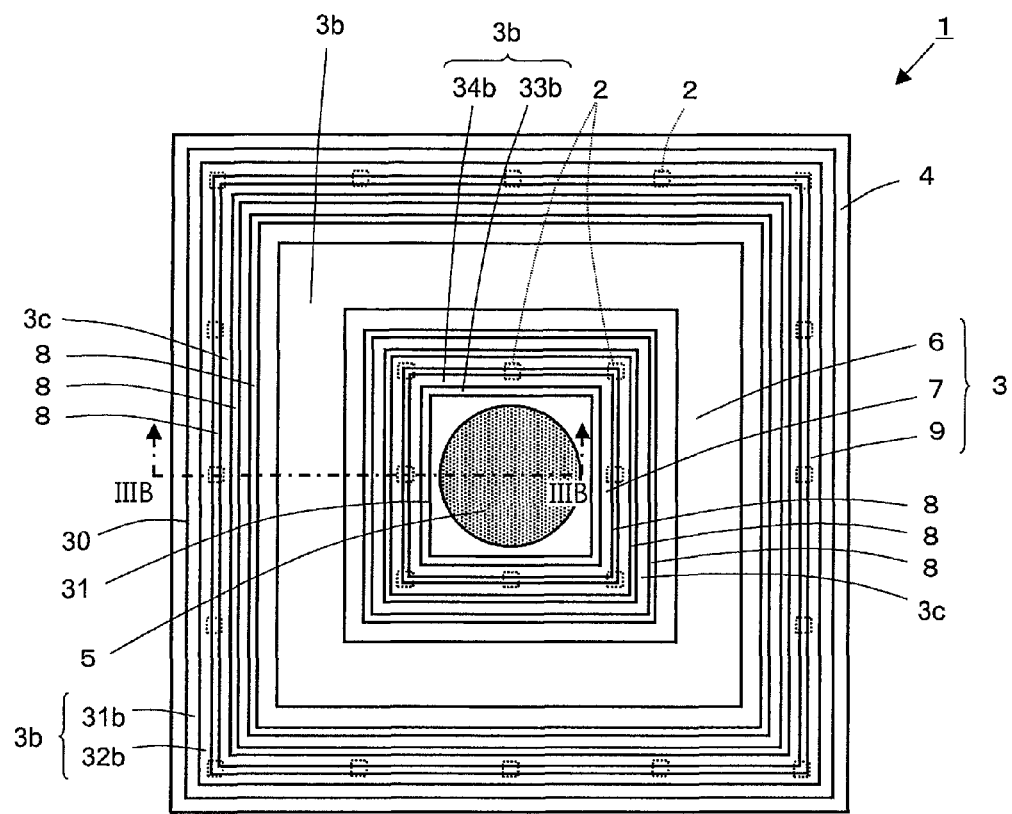
FIGS. 3A and 3B are a plan view of an illumination apparatus in accordance with a third embodiment of the present invention and a sectional view taken along line IIIB-IIIB in FIG. 3A, respectively.
Figure 3B:
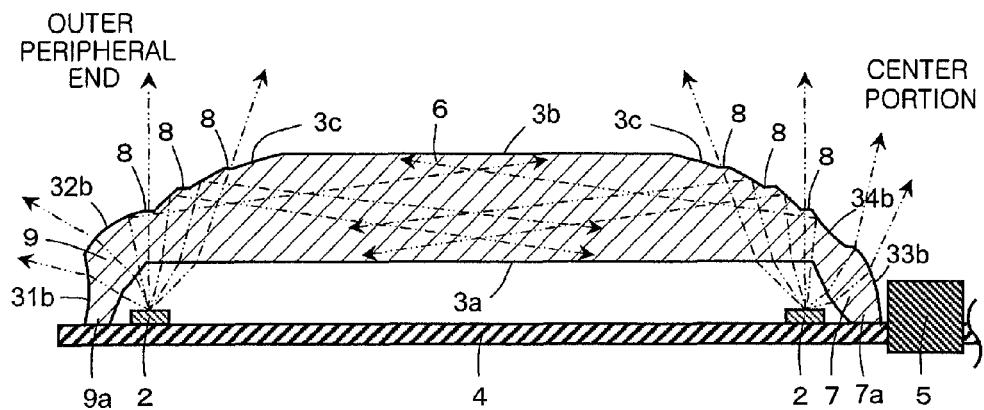

Next, an illumination apparatus in accordance with a third embodiment of the present invention will be described with reference to FIGS. 3A and 3B. In an illumination apparatus 1 in accordance with this embodiment, a light guide plate 3 includes a lateral light guide part 9 which is integrated with a main light guide part 6 in the periphery of the main light guide part 6 and emits incident light toward the outer periphery of the housing 4. The lateral light guide part 9 is inclined toward the outer periphery of the housing 4, forming an acute angle with the housing 4, and has a concave light emission surface 31b formed in its outer peripheral end 9a (the outer peripheral end 30) side; and a convex light emission surface 32b formed in the main light guide part 6 side.

Light sources 2 are arranged along the lateral light guide part 9. An auxiliary light guide part 7 is inclined toward the outer periphery of the housing 4, forming an acute angle with the housing 4, and has a convex light emission surface 33b formed in its inner peripheral end 7a (the inner peripheral end 31) side; and a concave light emission surface 34b formed in the main light guide part 6 side. The light guide plate 3 and the housing 4 have a quadrangular shape. Other configurations are the same as those in the first and second embodiments.

In the illumination apparatus 1 of this embodiment, lights incident from some light sources 2 disposed near the auxiliary light guide part 7 into the auxiliary light guide part 7 are irradiated from the central portion toward the front side of the illumination apparatus 1. Lights incident from some light sources 2 disposed near the lateral light guide part 7 into the lateral light guide part 9 are transmitted through the lateral light guide part 9 and are irradiated toward the outer periphery of the light guide plate 3. Lights incident from the light sources 2 disposed near the auxiliary light guide part 7 and the light sources disposed near the lateral light guide part 9 into the light incidence surface 3a of the main light guide part 6 are scattered and emitted from the light emission surface 3b in the light irradiation direction of the illumination apparatus 1, as in the first and second embodiments.

With the illumination apparatus 1 of this embodiment, the lights incident from the light sources 2 into the lateral light guide part 9 are irradiated toward the outer periphery of the light guide plate 3, and thus the lights from the light sources 2 are distributed over a wide range, thereby improving the brightness of a space where the illumination apparatus 1 is installed.

In addition, since the light emission surface 3b of the auxiliary light guide part 7 is configured as described above, the lights from the light sources 2 can be refracted by the light emission surface 3b of the auxiliary light guide part 7 toward the central portion of the illumination apparatus 1. This allows the lights from the light sources 2 to be efficiently irradiated in the central portion of the illumination apparatus 1.

Furthermore, since the light emission surface 3b of the lateral light guide part 9 is configured as described above, the lights from the light sources 2 can be refracted by the light emission surface 3b of the lateral light guide part 9 toward the outer periphery of the light guide plate 3. This allows the lights from the light sources 2 to be efficiently irradiated toward the outer periphery of the light guide plate 3 and thus can improve the brightness of a space where the illumination apparatus 1 is installed.

Next, an illumination apparatus in accordance with a fourth embodiment of the present invention will be described with reference to FIGS. 4A to 4D. In an illumination apparatus 1 in accordance with this embodiment, a total-reflective surface 3c of a light guide plate 3 has an uneven section perpendicular to a light guide direction of a main light guide part 6. As shown in FIGS. 4C and 4D, this uneven section has convex portions projecting toward the front side (hereinafter referred to as "convex shaped portions 3d"); and concave portions which are flat but concave with respect to the convex shaped portions 3d (hereinafter referred to as "concave shaped portions 3e").

The convex shaped portions 3d are respectively formed over light sources 2 in a one-to-one correspondence. The convex shaped portions 3d become enlarged in the light guide direction of the main light guide part 6. That is, as shown in FIG. 4C which shows a section taken along line IVC-IVC in FIGS. 4A and 4B, and FIG. 4D which shows a section taken along line IVD-IVD in FIGS. 4A and 4B, a width "W" of each of the convex shaped portions 3d and a height "H" of each of the convex shaped portion 3d with respect to a surface of the concave shaped portion 3e becomes increased in the light guide direction of the main light guide part 6.

In this embodiment, the total-reflective surface 3c continues to a light emission surface 3b of the main light guide part 6 in a smoothing manner and continues to a light emission surface 3b of the auxiliary light guide part 7 in a bent manner. A total-reflective surface 3c, which corresponds to an area between one light source 2 and another light source 2 but does not have a convex shape, is more smoothly inclined with respect to the housing 4 than the total-reflective surface 3c having the convex shape. Other configurations are the same as those in the first to third embodiments.

If the section perpendicular to the light guide direction of the main light guide part 6 is in parallel to the housing 4, the lights from the light sources 2 are not incident vertically with respect to the total-reflective surface 3c except immediately above the light sources 2. In this case, the lights totally reflected by the total-reflective surface 3c diverges in a direction perpendicular to the radial direction of the light guide plate 3 (hereinafter referred to as a "third axial direction") and the light irradiation direction of the illumination apparatus 1, which results in a less amount of light in the radial direction of the light guide plate 3.

Figure 4A:
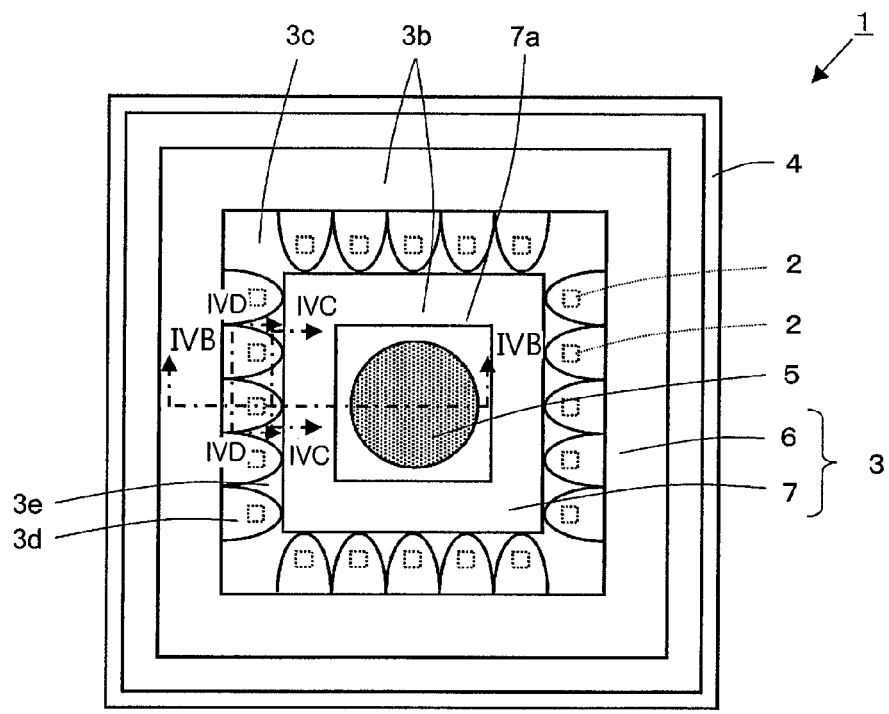
FIGS. 4A to 4D are a plan view of an illumination apparatus in accordance with a fourth embodiment of the present invention, a sectional view taken along line IVB-IVB in FIG. 4A, a sectional view taken along line IVC-IVC in FIGS. 4A and 4B, and a sectional view taken along line IVD-IVD in FIGS. 4A and 4B, respectively.
Figure 4B:
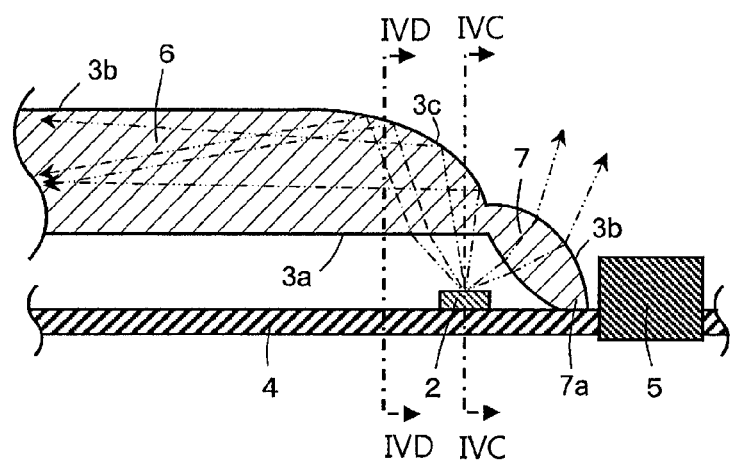
Figure 4C:
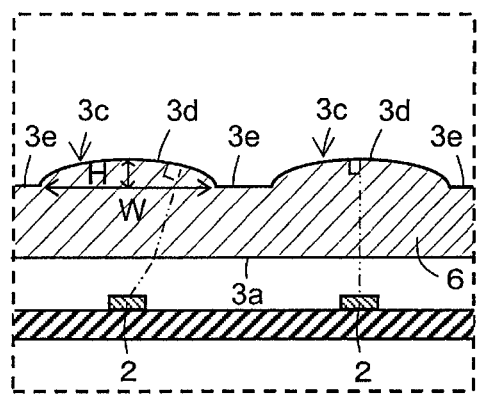
Figure 4D:
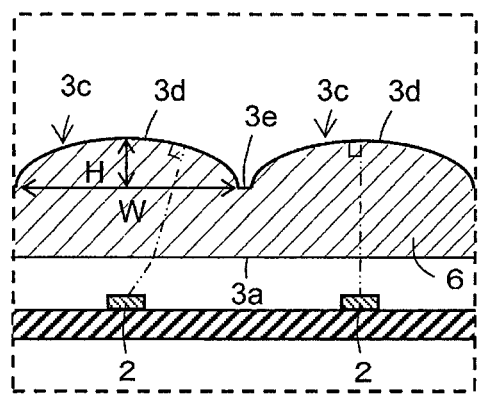

In contrast, in this embodiment, the total-reflective surface 3c is configured such that the lights from the light sources 2 are incident vertically with respect to the total-reflective surface 3c (see FIG. 4B). As a result, the lights incident into the total-reflective surface 3c can be totally reflected toward the outer periphery of the light guide plate 3 and effectively guided to the light guide plate 3.

With the illumination apparatus 1 of this embodiment, since the light emitted from the light sources 2 in the third axial direction is totally reflected by the total-reflective surface 3c toward the outer periphery of the light guide plate 3, it is possible to increase the amount of light irradiated toward the outer periphery of the light guide plate 3. As a result, the more amount of light from the light sources 2 is diffused and emitted from the light emission surface 3b of the main light guide part 6, which can result in uniform irradiation of the light from the light sources 2 through the entire surface of the illumination apparatus 1.

Figure 5:
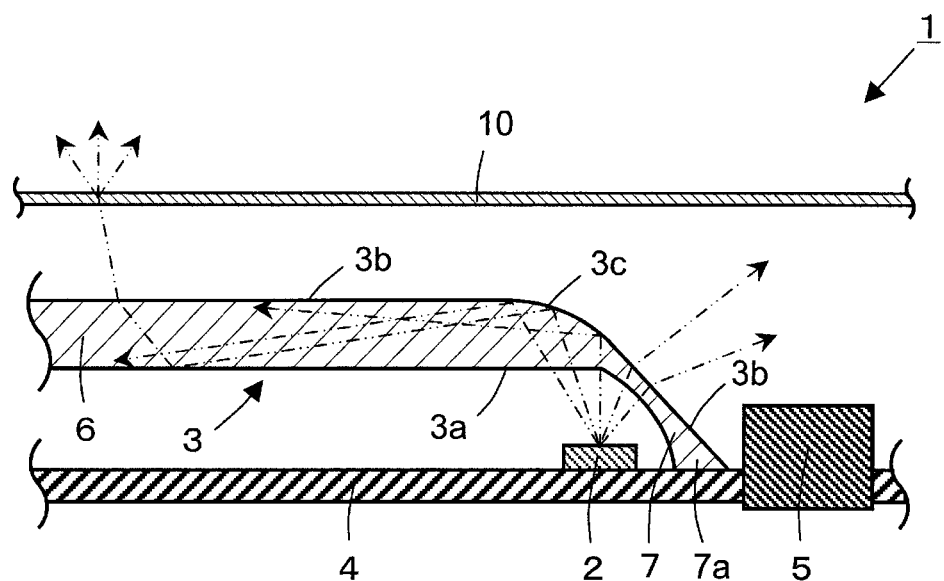
FIG. 5 is a side sectional view of an illumination apparatus in accordance with a fifth embodiment of the present invention.
Figure 6:
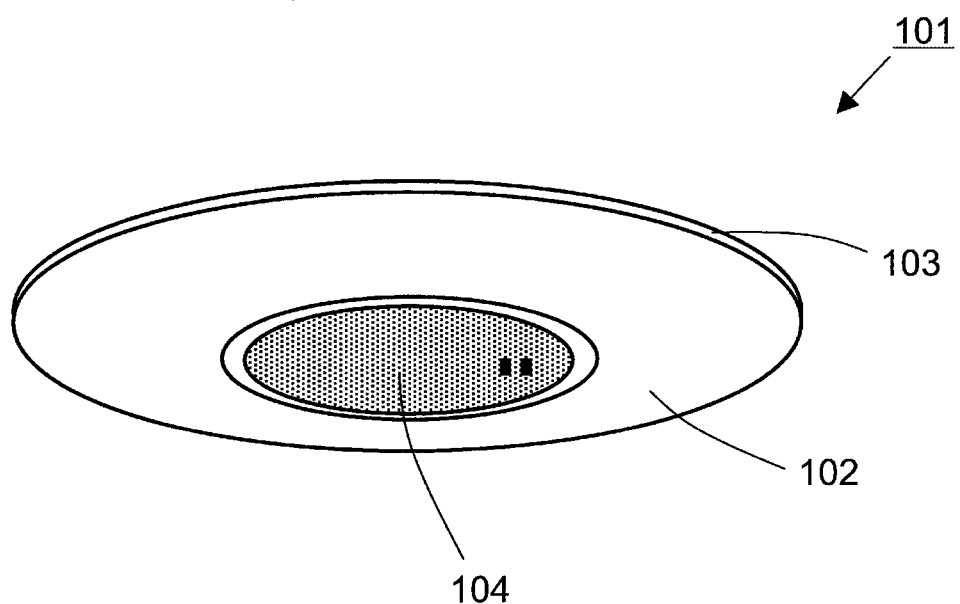
FIG. 6 is a perspective view of a conventional illumination apparatus.

Next, an illumination apparatus in accordance with a fifth embodiment of the present invention will be described with reference to FIG. 5. An illumination apparatus 1 in accordance with this embodiment further includes a diffusing transmission plate 10 which diffuses light emitted from a light guide plate 3. The diffusing transmission plate 10 is provided to cover a light emission surface 3b of the light guide plate 3. An end of the diffusing transmission plate 10 is connected to the housing 4 such that the diffusing transmission plate 10 is held in the housing 4.

The diffusing transmission plate 10 serves as a general-purposed bowl-shaped or dome-shaped sealing member and is attached to the periphery of the housing 4 to cover the front side of the housing 4. Here, the attached state of the diffusing transmission plate 10 is not shown. The diffusing transmission plate 10 may be formed by processing a transparent resin material, such as polycarbonate or acryl, into a bowl shape and forming fine unevenness on a surface thereof or containing diffusive particles or the like in the resin material. In this case, as in the housing 4, heat generated by the light sources 2 may expose the interior of the illumination apparatus 1 to a high temperature, and thus the diffusing transmission plate 10 is required to be made of a material having high heat resistance and durability. Other configurations are the same as those in the first to fourth embodiments.

In the illumination apparatus 1 of this embodiment, the lights from the light sources 2 are incident into a light incidence surface 3a of the light guide plate 3 and are scattered from the light emission surface 3b of the light guide plate 3, as in the earlier-described embodiments. Then, the scattered lights are irradiated to the diffusing transmission plate 10 and are uniformly diffused outside the illumination apparatus 1.

With the illumination apparatus 1 of this embodiment, the lights emitted from the light guide plate 3 are secondarily uniformly diffused by the diffusing transmission plate 10, it is possible to uniformly irradiate the lights from the light sources 2 through the entire surface of the illumination apparatus and thus provide good visual quality for the illumination apparatus 1.

While the invention has been shown and described with respect to the embodiments, it will be understood by those skilled in the art that various changes and modifications may be made without departing from the scope of the invention as defined in the following claims.

For example, a high-reflective sheet may be provided in the inner surface of the housing 4 to provide a reflectivity for the inner surface. In addition, the total-reflective surface 3c may be subjected to a silver deposition or a multilayer treatment in order to prevent light leakage.

What is claimed is:

1. An illumination apparatus, comprising:
    light sources;
    a light guide plate which guides lights from the light sources;
    a housing which holds the light sources and the light guide plate; and
    an apparatus attachment part which is provided in a central portion of the housing,
    wherein the light sources are arranged around the apparatus attachment part, and the light guide plate is provided outside the apparatus attachment part and is arranged to face the housing and cover a front side of the light sources, and
    wherein the light guide plate includes a main light guide part which guides the lights from the light sources toward an outer periphery of the light guide plate and scatters and emits the lights to a surface of the main light guide part,
    wherein the light guide plate further includes an auxiliary light guide part which is integrated with the main light guide part at an inner peripheral side of the main light guide part and guides and emits the lights from the light sources toward the central portion of the housing,
    wherein the auxiliary light guide part has an inner peripheral end which is located in the opposite side to the main light guide part and is provided to extend to approach the central portion of the housing, and
    wherein the auxiliary light guide part is inclined toward the central portion of the housing while forming an acute angle with the housing, and is formed to conform to a periphery of the apparatus attachment part.

2. The illumination apparatus of claim 1, wherein the light guide plate further includes a total-reflective surface which is formed between the main light guide part and the auxiliary light guide part and totally reflects lights, which are incident from the light sources into the light guide plate, into the main light guide part.

3. The illumination apparatus of claim 2, wherein the total-reflective surface has an uneven section perpendicular to a light guide direction of the main light guide part, and a width and a height of a convex portion in the section become increased in the light guide direction of the main light guide part.

4. The illumination apparatus of claim 2,
wherein the total-reflective surface is curved and smoothly continues extends to a light emission surface of the main light guide part and is inclined at a predetermined angle with respect to the housing,
wherein the inclination of the curved total-reflective surface is designed in consideration of a refractive index of the main light guide part, a positional relationship between the main light guide part and the light sources, and a refraction in a light incidence surface of the main light guide part such that an incidence angle of the light from the light sources exceeds a critical angle, and
wherein the auxiliary light guide part is integrated with the main light guide part at the inner peripheral side of the main light guide part via the total-reflective surface.

5. The illumination apparatus of claim 1, wherein the light guide plate has a transmission surface which is formed between the main light guide part and the auxiliary light guide part and transmits and externally emits lights incident between surfaces which totally reflect the lights, incident from the light sources in the light guide plate, into the main light guide part, with no total-reflection.

6. The illumination apparatus of claim 1, wherein the auxiliary light guide part has a convex light emission surface formed in the outer peripheral end side thereof; and a concave light emission surface formed in the main light guide part side.

7. The illumination apparatus of claim 1, wherein the light guide plate has a lateral light guide part which is integrated with the main light guide part in the outer periphery of the main light guide part and emits an incident light toward the outer periphery of the housing.

8. The illumination apparatus of claim 7, wherein the lateral light guide part is inclined toward the outer periphery of the housing, forming an acute angle with the housing, and has a concave light emission surface formed in the outer peripheral end side thereof; and a convex light emission surface formed in the main light guide part side.

9. The illumination apparatus of claim 1, further comprising a diffusing transmission member which diffuses a light emitted from the light guide plate.

* * * * *